United States Patent
Li et al.

(10) Patent No.: US 12,451,934 B2
(45) Date of Patent: Oct. 21, 2025

(54) METHOD AND APPARATUS FOR FEEDING BACK LAYER INFORMATION, METHOD AND APPARATUS FOR RECEIVING LAYER INFORMATION, COMMUNICATION NODE AND MEDIUM

(71) Applicant: ZTE CORPORATION, Guangdong (CN)

(72) Inventors: Yong Li, Guangdong (CN); Hao Wu, Guangdong (CN); Guozeng Zheng, Guangdong (CN); Zhaohua Lu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 668 days.

(21) Appl. No.: 17/628,291

(22) PCT Filed: May 29, 2020

(86) PCT No.: PCT/CN2020/093099
§ 371 (c)(1),
(2) Date: Jan. 19, 2022

(87) PCT Pub. No.: WO2021/012784
PCT Pub. Date: Jan. 28, 2021

(65) Prior Publication Data
US 2022/0263543 A1    Aug. 18, 2022

(30) Foreign Application Priority Data

Jul. 19, 2019  (CN) .......................... 201910660046.9

(51) Int. Cl.
*H04B 7/0417*    (2017.01)
*H04B 7/0456*    (2017.01)
*H04B 7/06*      (2006.01)

(52) U.S. Cl.
CPC .......... *H04B 7/0417* (2013.01); *H04B 7/0486* (2013.01); *H04B 7/0634* (2013.01); *H04B 7/0639* (2013.01)

(58) Field of Classification Search
CPC ....... H04L 1/0026; H04L 5/0094; H04L 1/06; H04L 5/0048; H04B 7/0639;
(Continued)

(56) References Cited

U.S. PATENT DOCUMENTS

| 11,909,465 B2 * | 2/2024 | Matsumura ........... H04W 16/28 |
| 2013/0021991 A1 * | 1/2013 | Ko ........................ H04L 5/0053 370/329 |

(Continued)

FOREIGN PATENT DOCUMENTS

| CN | 107733491 A | 2/2018 |
| CN | 108260364 A | 7/2018 |

(Continued)

OTHER PUBLICATIONS

Ericsson: "Corrections and clarifications for CSI measurement", 3GPP Draft; R1-1806215 Corrections and Clarifications for CSI Measurement, 3rd Generation Partnership Project (3GPP), Mobile Competence Centre ; 650, Route Des Lucioles ; F-06921 Sophia-Antipolis Cede, vol. RAN WG1, No. Busan, Korea; 2018 (Year: 2018).*

(Continued)

*Primary Examiner* — Mehmood B. Khan
(74) *Attorney, Agent, or Firm* — KDW FIRM PLLC

(57) ABSTRACT

Provided are a method and apparatus for feeding back layer information, a method and apparatus for receiving layer information, a communication node and a medium. The method for feeding back layer information includes: receiving configuration information of a first communication node; determining layer information of the first communication (Continued)

Transmit configuration information to a second communication node — S210

Receive layer information fed back by the second communication node, where the layer information is determined by the second communication node according to the configuration information — S220 node according to the configuration information; and feeding back the layer information to the first communication node.

17 Claims, 2 Drawing Sheets

(58) Field of Classification Search
CPC .... H04B 7/0632; H04B 7/0634; H04B 7/063; H04B 7/0417; H04B 7/0486
See application file for complete search history.

(56) References Cited

U.S. PATENT DOCUMENTS

| | | | | |
|---|---|---|---|---|
| 2013/0121269 A1* | 5/2013 | Nammi | ............ | H04L 25/03343 370/329 |
| 2013/0258874 A1* | 10/2013 | Khoshnevis | .......... | H04L 5/0064 370/252 |
| 2014/0016475 A1* | 1/2014 | Zhou | .................. | H04W 72/569 370/236 |
| 2014/0050151 A1* | 2/2014 | Riddington | ........... | H04L 1/0026 370/328 |
| 2014/0119228 A1* | 5/2014 | Wang | .................... | H04W 24/10 370/252 |
| 2016/0261328 A1 | 9/2016 | Kim et al. | | |
| 2018/0302192 A1* | 10/2018 | Yang | .................... | H04B 7/0626 |
| 2019/0081678 A1 | 3/2019 | Park | | |
| 2022/0393724 A1* | 12/2022 | Matsumura | ........... | H04W 16/28 |

FOREIGN PATENT DOCUMENTS

| | | |
|---|---|---|
| CN | 108781448 A | 11/2018 |
| CN | 110535606 A | 12/2019 |

OTHER PUBLICATIONS

International Search Report for the International Patent Application No. PCT/CN2020/093099, mailed Aug. 14, 2020, 4 pages.
Ericsson, "Corrections and clarifications for CSI Measurement," 3GPP TSG RAN WG1 Meeting #93, Busan Korea, May 20, 2018.
European Search Report for Application No. 20845016 dated Jun. 29, 2023.

* cited by examiner

METHOD AND APPARATUS FOR FEEDING BACK LAYER INFORMATION, METHOD AND APPARATUS FOR RECEIVING LAYER INFORMATION, COMMUNICATION NODE AND MEDIUM

CROSS-REFERENCE TO RELATED APPLICATIONS

This is a National Stage Application filed under 35 U.S.C. 371 based on International Patent Application No. PCT/CN2020/093099, filed on May 29, 2020, which claims priority to Chinese Patent Application No. 201910660046.9 filed on Jul. 19, 2019, disclosures of both of which are incorporated herein by reference in their entireties.

TECHNICAL FIELD

The present application relates to wireless communication networks, for example, a method and apparatus for feeding back layer information, a method and apparatus for receiving layer information, a communication node and a medium.

BACKGROUND

Wireless communication technology has a great influence on production and life. With the development of society and science and technology, the amount of data in wireless communication is growing, and the requirements for communication efficiency are increasingly high. In the process of wireless communication with other communication nodes, since the data transmission performance is unknown to the current communication node, there are some problems such as unstable signals, poor receiving quality and a high delay during data transmission, which leads to low communication efficiency and poor reliability.

SUMMARY

The present application provides a method and apparatus for feeding back layer information, a method and apparatus for receiving layer information, a communication node and a medium to improve communication efficiency and reliability by feeding back layer information.

An embodiment of the present application provides a method for feeding back layer information. The method includes the following.

Configuration information of a first communication node is received.

Layer information of the first communication node is determined according to the configuration information.

The layer information is fed back to the first communication node.

An embodiment of the present application further provides a method for receiving layer information. The method includes the following.

Configuration information is transmitted to a second communication node.

Layer information fed back by the second communication node is received, where the layer information is determined by the second communication node according to the configuration information.

An embodiment of the present application further provides an apparatus for feeding back layer information. The apparatus includes a first receiving module, a measurement module, and a feedback module.

The first receiving module is configured to receive configuration information of a first communication node.

The measurement module is configured to determine layer information of the first communication node according to the configuration information.

The feedback module is configured to feed back the layer information to the first communication node.

An embodiment of the present application further provides an apparatus for receiving layer information. The apparatus includes a transmission module and a second receiving module.

The transmission module is configured to transmit configuration information to a second communication node.

The second receiving module is configured to receive layer information fed back by the second communication node, where the layer information is determined by the second communication node according to the configuration information.

An embodiment of the present application further provides a communication node. The communication node includes one or more processors and a storage apparatus.

The storage apparatus is configured to store one or more programs.

The one or more programs, when executed by the one or more processors, enable the one or more processors to implement the method for feeding back layer information or the method for receiving layer information described above.

An embodiment of the present disclosure further provides a computer-readable storage medium. The computer-readable storage medium is configured to store a computer program which, when executed by a processor, implements the method for feeding back layer information or the method for receiving layer information described above.

DETAILED DESCRIPTION

Figure 1:
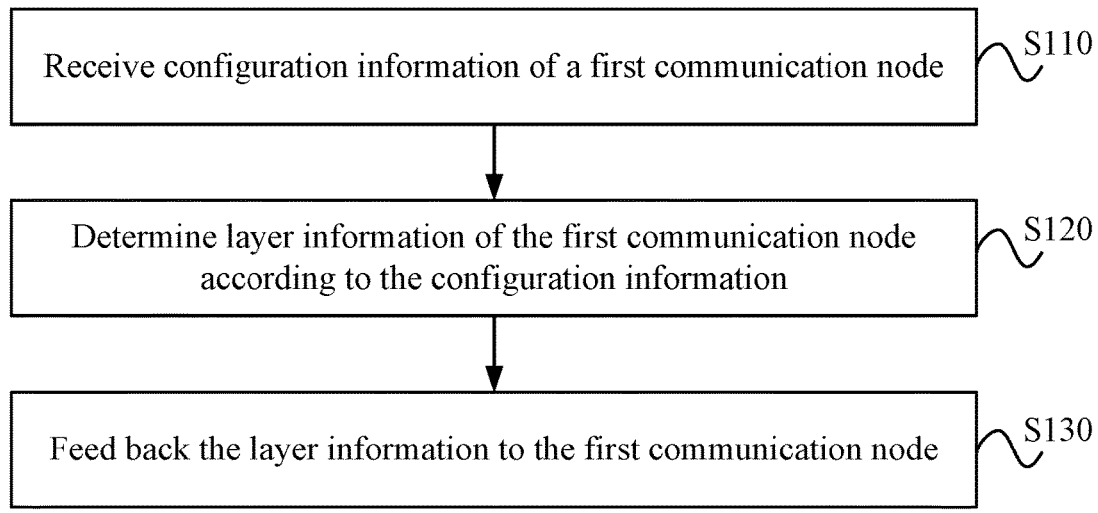
FIG. 1 is a flowchart of a method for feeding back layer information according to an embodiment.

The present application is described below in conjunction with drawings and embodiments. The embodiments described herein are intended to explain and not to limit the present application. For ease of description, only part, not all, of structures related to the present application is illustrated in the drawings.

For two communication nodes that need to transmit data, for example, in the data transmission between a base station and a user terminal, the data transmission between a base station and a base station, the data transmission between a user terminal and a user terminal and the like, space-division multiplexing is usually adopted for huge data volume, which means that one communication node transmits multi-layer signals to another communication node. However, since the transmission performance and related information of each layer are unknown to the communication nodes, the communication nodes are incapable of distinguishing the performance of each layer and making efficient data transmission decisions, which leads to low communication efficiency.

Based on the case that communication nodes transmit multi-layer signals by space-division multiplexing, in this embodiment, a communication node for transmitting a layer signal is taken as a first communication node, a communication node for receiving the layer signal is taken as a second communication node, and the second communication node feeds back layer information to the first communication node to indicate the relevant transmission performance of each layer, so that the first communication node can make full use of each layer to make an efficient data transmission decision, thereby improving the communication efficiency and reliability.

FIG. 1 is a flowchart of a method for feeding back layer information according to an embodiment. As shown in FIG. 1, the method for feeding back layer information provided by this embodiment is applied to a second communication node and includes S110, S120, and S130.

In S110, configuration information of a first communication node is received.

The configuration information is transmitted by the first communication node to the second communication node as a basis for the second communication node to determine the layer information. For example, the configuration information may include a reference signal, and the reference signal is transmitted to the second communication node through different layers or transmitted to the second communication node through different ports, and the second communication node receives and measures the reference signal to obtain signal received power of each layer or a specific layer. For example, the configuration information may include column vectors of a precoding matrix, and the second communication node may determine column vectors corresponding to each layer or a specific layer according to the configuration information. In another example, the configuration information may include a codebook type, a frequency band, configuration information for a be-fed-back layer, configuration information for a reporting order of each layer, an enabling state of each configuration, and the like. The configuration information may be specified by a protocol or configured by the first communication node.

In S120, layer information of the first communication node is determined according to the configuration information.

The second communication node determines the layer information according to the received configuration information. The layer information may include received power for each layer or a specific layer, receiving quality, a column vector of a precoding matrix corresponding to each layer or a specific layer, and the like, for indicating to the first communication node the relevant transmission performance of each layer or a specific layer.

In S130, the layer information is fed back to the first communication node.

The layer information is fed back to the first communication node to indicate the relevant transmission performance of each layer or a specific layer so that the first communication node makes a data transmission decision of space division multiplexing according to the layer information. For example, if the layer information includes reference signal received power for each layer, the first communication node may compare the magnitude of the signal received power of the second communication node for each transmission antenna port or the magnitude of the signal received power of the second communication node for each layer so as to map the to-be-transmitted data to different antenna ports or layers for transmission.

Figure 2:
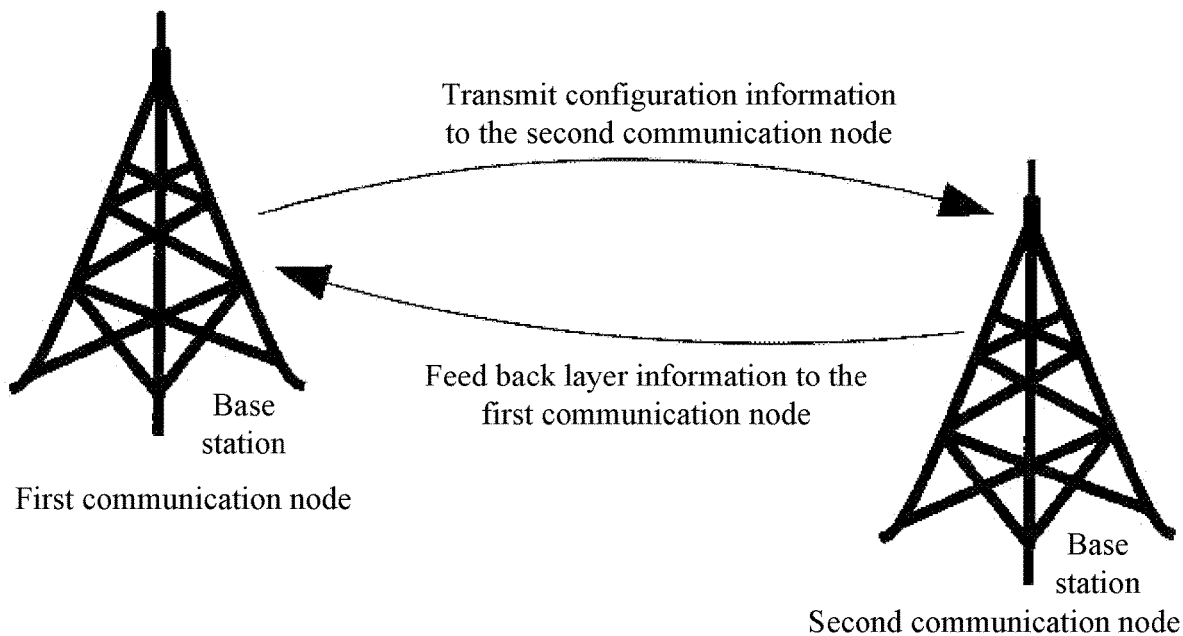
FIG. 2 is a schematic diagram of an application scenario of a method for feeding back layer information according to an embodiment.

FIG. 2 is a schematic diagram of an application scenario of a method for feeding back layer information according to an embodiment. As shown in FIG. 2, the first communication node transmits the configuration information to the second communication node, and the second communication node determines the layer information according to the configuration information and feeds back the layer information to the first communication node. The first communication node may transmit a layer signal to the second communication node by space-division multiplexing. For example, the first communication node transmits one layer of signals at one antenna port and transmits multi-layer signals through multiple antenna ports. In another example, the first communication node maps signals to antenna ports through a precoding matrix for transmission and transmits layer signals, and the transmitted layer signals correspond to each column vector in the precoding matrix respectively. The above-mentioned method is also applicable to the case where only one layer of signals is transmitted, which means that the first communication node only includes one layer. The method of this embodiment is applicable to any two communication nodes that have a data transmission relationship. For example, the second communication node, in addition to feeding back the layer information to the first communication node, may also communicate with a third communication node and send configuration information to the third communication node, and the third communication node feeds back layer information of the second communication node to the second communication node. The communication node may be a base station or a user terminal.

In an embodiment, the method for feeding back layer information further includes: a transmission rank order is determined according to the layer information. The transmission rank order may include a layer reporting order, an order of layers in a reporting sequence, a layer priority and the like, for indicating to the first communication node a transmission rule of the layer information, for example, a layer with the highest received power is reported first, a layer with the smallest index number has the highest priority, and so on. In a case where the first communication node receives the layer information, the first communication node may know the transmission characteristic of each layer according to the transmission rank order or obtains the layer information according to the transmission rank order, or the transmission rank order carries the corresponding layer information, thereby saving the bit overhead of transmitting the corresponding layer information.

In an embodiment, the layer information includes layer received strength, and the transmission rank order includes at least one of: a layer reporting order, an order of layers in a reporting sequence, a layer priority or a layer index number. In this embodiment, the transmission rank order is determined according to the layer received strength. In a case where the first communication node receives the layer information, the first communication node may know the layer received strength according to the transmission rank order. The layer received strength may be measured by the second communication node in a case where the second communication node receives the configuration information or may be obtained according to the configuration information.

In an embodiment, the layer reporting order is determined according to the layer received strength, and the layer reporting order may be determined according to the order of the magnitude of the layer received strength. For example, layer information corresponding to a layer with high received strength is reported first while layer information corresponding to a layer with low received strength is reported later; or the layer information corresponding to the layer with low received strength is reported first while the layer information corresponding to the layer with high received strength is reported later. After the first communication node receives the layer information, the first communication node may determine the layer received strength according to the layer reporting order.

In an embodiment, the order of layers in a reporting sequence is determined according to the layer received strength, and the order of layers in a reporting sequence may be determined according to the order of the magnitude of the layer received strength. For example, the layer information corresponding to the layer with high received strength is located before the layer information corresponding to the layer with low received strength in the reporting sequence, which means that the layer information corresponding to the layer with low received strength is reported after the layer information corresponding to the layer with high received strength is reported; or the layer information corresponding to the layer with high received strength is located after the layer information corresponding to the layer with low received strength in the reporting sequence, which means that the layer information corresponding to the layer with low received strength is reported before the layer information corresponding to the layer with high received strength is reported. After the first communication node receives the layer information, the first communication node may determine the layer received strength according to the order of layers in a reporting sequence.

In an embodiment, the layer priority is determined according to the layer received strength, and the layer priority may be determined according to the order of the magnitude of the layer received strength. For example, the layer information corresponding to the layer with high received strength is given priority over the layer information corresponding to the layer with low received strength, which means that the priority of the layer with high received strength is higher than the priority of the layer with low received strength; or the layer information corresponding to the layer with low received strength is given priority over the layer information corresponding to the layer with high received strength, which means that the priority of the layer with high received strength is lower than the priority of the layer with low received strength. The priority may refer to the reporting order or the reporting importance, or in a case where layer information of a part of multiple layers needs to be reported, a layer with a high priority is reported first, and a layer with a low priority may be discarded. In a case where the first communication node receives the layer information, the first communication node may determine the layer received strength according to the layer priority.

In an embodiment, the layer index number is determined according to the layer received strength, and the layer index number may be determined according to the order of the magnitude of the layer received strength. For example, a layer index number corresponding to the layer with high received strength is smaller while a layer index number corresponding to the layer with low received strength is larger; or the layer index number corresponding to the layer with high received strength is larger while the layer index number corresponding to the layer with low received strength is smaller. In a case where the first communication node receives the layer information, the first communication node may determine the layer received strength according to the layer index number.

In an embodiment, the layer information includes a layer delay, and the transmission rank order includes at least one of: a layer reporting order, an order of layers in a reporting sequence, a layer priority or a layer index number. In this embodiment, the transmission rank order is determined according to the layer delay. After the first communication node receives the layer information, the first communication node may know the layer delay according to the transmission rank order. The layer delay may be measured by the second communication node after the second communication node receives the configuration information or may be obtained according to the configuration information.

In an embodiment, the layer reporting order is determined according to the layer delay, and the layer reporting order may be determined according to the order of the magnitude of the layer delay. For example, layer information corresponding to a layer with a large delay is reported first while layer information corresponding to a layer with a small delay is reported later; or the layer information corresponding to the layer with a large delay is reported first while the layer information corresponding to the layer with a small delay is reported later. After the first communication node receives the layer information, the first communication node may determine the layer delay according to the layer reporting order.

In an embodiment, the order of layers in a reporting sequence is determined according to the layer delay, and the order of layers in a reporting sequence may be determined according to the order of the magnitude of the layer delay. For example, the layer information corresponding to the layer with a large delay is located before the layer information corresponding to the layer with a small delay in the reporting sequence, which means that the layer information corresponding to the layer with a small delay is reported after the layer information corresponding to the layer with a large delay is reported; or the layer information corresponding to the layer with a large delay is located after the layer information corresponding to the layer with a small delay in the reporting sequence, which means that the layer information corresponding to the layer with a small delay is reported before the layer information corresponding to the layer with a large delay is reported. After the first communication node receives the layer information, the first communication node may determine the layer delay according to the order of layers in a reporting sequence.

In an embodiment, the layer priority is determined according to the layer delay, and the layer priority may be determined according to the order of the magnitude of the layer delay. For example, the layer information corresponding to the layer with a large delay is given priority over the layer information corresponding to the layer with a small delay, which means that the priority of the layer with a large delay is higher than the priority of the layer with a small delay; or the layer information corresponding to the layer with a small delay is given priority over the layer information corresponding to the layer with a large delay, which means that the priority of the layer with a large delay is lower than the priority of the layer with a small delay. In a case where the first communication node receives the layer information, the first communication node may determine the layer delay according to the layer priority.

In an embodiment, the layer index number is determined according to the layer delay, and the layer index number may be determined according to the order of the magnitude of the layer delay. For example, a layer index number corresponding to the layer with a large delay is smaller while a layer index number corresponding to the layer with a small delay is larger; or the layer index number corresponding to the layer with a large delay is larger while the layer index number corresponding to the layer with a small delay is smaller. In a case where the first communication node receives the layer information, the first communication node may determine the layer delay according to the layer index number.

In an embodiment, the layer information includes a layer priority, and the transmission rank order includes at least one of: a layer reporting order, an order of layers in a reporting sequence or a layer index number. In this embodiment, the transmission rank order is determined according to the layer priority. In a case where the first communication node receives the layer information, the first communication node may know the layer priority according to the transmission rank order. The layer priority may be measured by the second communication node in a case where the second communication node receives the configuration information or may be obtained according to the configuration information.

In an embodiment, the layer reporting order is determined according to the layer priority, and the layer reporting order may be determined according to the order of the layer priority. For example, layer information corresponding to a layer with a high priority is reported first while layer information corresponding to a layer with a low priority is reported later; or the layer information corresponding to the layer with a low priority is reported first while the layer information corresponding to the layer with a high priority is reported later. In a case where the first communication node receives the layer information, the first communication node may obtain the layer priority according to the layer reporting order.

In an embodiment, the order of layers in a reporting sequence is determined according to the layer priority, and the order of layers in a reporting sequence may be determined according to the order of the layer priority. For example, the layer information corresponding to the layer with a high priority is located before the layer information corresponding to the layer with a low priority in the reporting sequence, which means that the layer information corresponding to the layer with a low priority is reported after the layer information corresponding to the layer with a high priority is reported; or the layer information corresponding to the layer with a high priority is located after the layer information corresponding to the layer with a low priority in the reporting sequence, which means that the layer information corresponding to the layer with a low priority is reported before the layer information corresponding to the layer with a high priority is reported. After the first communication node receives the layer information, the first communication node may determine the layer priority according to the order of layers in a reporting sequence.

In an embodiment, the layer index number is determined according to the layer priority, and the layer index number may be determined according to the order of the layer priority. For example, a layer index number corresponding to the layer with a high priority is smaller while a layer index number corresponding to the layer with a low priority is larger; or the layer index number corresponding to the layer with a high priority is larger while the layer index number corresponding to the layer with a low priority is smaller. In a case where the first communication node receives the layer information, the first communication node may determine the layer priority according to the layer index number.

In an embodiment, the layer information includes a layer index number, and the transmission rank order includes at least one of: a layer reporting order, an order of layers in a reporting sequence or a layer priority. In this embodiment, the transmission rank order is determined according to the layer index number. In a case where the first communication node receives the layer information, the first communication node may know the layer index number according to the transmission rank order. The layer index number may be measured by the second communication node in a case where the second communication node receives the configuration information or may be obtained according to the configuration information.

In an embodiment, the layer reporting order is determined according to the layer index number, and the layer reporting order may be determined according to the order of the magnitude of the layer index number. For example, layer information corresponding to a layer with a large index number is reported first while layer information corresponding to a layer with a small index number is reported later; or the layer information corresponding to the layer with a small index number is reported first while the layer information corresponding to the layer with a large index number is reported later. In a case where the first communication node receives the layer information, the first communication node may obtain the layer index number according to the layer reporting order.

In an embodiment, the order of layers in a reporting sequence is determined according to the layer index number, and the order of layers in a reporting sequence may be determined according to the order of the magnitude of the layer index number. For example, the layer information corresponding to the layer with a large index number is located before the layer information corresponding to the layer with a small index number in the reporting sequence, which means that the layer information corresponding to the layer with a small index number is reported after the layer information corresponding to the layer with a large index number is reported; or the layer information corresponding to the layer with a large index number is located after the layer information corresponding to the layer with a small index number in the reporting sequence, which means that the layer information corresponding to the layer with a small index number is reported before the layer information corresponding to the layer with a large index number is reported. After the first communication node receives the layer information, the first communication node may determine the layer index number according to the order of layers in a reporting sequence.

In an embodiment, the layer priority is determined according to the layer index number, and the layer priority may be determined according to the order of the magnitude of the layer index number. For example, the layer information corresponding to the layer with a large index number is given priority over the layer information corresponding to the layer with a small index number, which means that the priority of the layer with a large index number is higher than the priority of the layer with a small index number; or the layer information corresponding to the layer with a small index number is given priority over the layer information corresponding to the layer with a large index number, which means that the priority of the layer with a large index number is lower than the priority of the layer with a small index number. In a case where the first communication node receives the layer information, the first communication node may determine the layer index number according to the layer priority.

In an embodiment, that a transmission rank order is determined according to the layer information includes: in a case where the first communication node has at least two layers, the layers are ordered in ascending order according to the layer information to obtain the transmission rank order; or in a case where the first communication node has at least two layers, the layers are ordered in descending order according to the layer information to obtain the transmission rank order. For example, in the above embodiment, the transmission rank order is obtained by ordering the layers in an ascending order or a descending order according to the layer received strength, the layer priority, the layer index number and the layer delay.

In an embodiment, that a transmission rank order is determined according to the layer information includes at least one of the following: the transmission rank order is determined according to a configuration order of the layer index number; or the transmission rank order is determined according to a reporting order of the layer index number. In this embodiment, the layer information includes a layer index number. The transmission rank order may be determined according to the configuration order of the layer index number, for example, the first communication node may configure an order of the index number, make the order to be included in configuration information, and send the configuration information to the second communication node to implement the configuration of the transmission rank order of the layer information; the transmission rank order may also be determined according to a reporting order of the layer index number, for example, the second communication node indicates to the first communication node the transmission rank order of the layer information by reporting the order of the layer index number.

In an embodiment, the layer information includes first-type information and a layer index number, and the transmission rank order includes a reporting order of the layer index number. In an embodiment, that a transmission rank order is determined according to the layer information includes: in a case where the first communication node has at least two layers, the layers are ordered in descending order according to the first-type information to obtain the reporting order of the layer index number. The first-type information includes at least one of: layer received strength, layer received power, a layer signal-to-interference-plus-noise ratio (SINR) or a layer signal-to-noise ratio.

In an embodiment, the layer information includes a layer index number and layer received strength, and the layer index number is reported according to the order of the magnitude of the layer received strength. For example, a layer index number of the layer with high received strength is reported first while a layer index number of the layer with low received strength is reported later; or the layer index number of the layer with low received strength is reported first while the layer index number of the layer with high received strength is reported later. In a case where the first communication node receives the layer information, the first communication node may determine the layer received strength according to the reporting order of the layer index number.

In an embodiment, the layer information includes a layer index number and layer received power, and the layer index number is reported according to the order of the magnitude of the layer received power. For example, a layer index number of the layer with high received power is reported first while a layer index number of the layer with low received power is reported later; or the layer index number of the layer with low received power is reported first while the layer index number of the layer with high received power is reported later. In a case where the first communication node receives the layer information, the first communication node may determine the layer received power according to the reporting order of the layer index number.

In an embodiment, the layer information includes a layer index number and a layer SINR, and the layer index number is reported according to the order of the magnitude of the layer SINR. For example, a layer index number of the layer with a large SINR is reported first while a layer index number of the layer with a small SINR is reported later; or the layer index number of the layer with a small SINR is reported first while the layer index number of the layer with a large SINR is reported later. In a case where the first communication node receives the layer information, the first communication node may determine the SINR according to the reporting order of the layer index number.

In an embodiment, the layer information includes a layer index number and a layer signal-to-noise ratio, and the layer index number is reported according to the order of the magnitude of the layer signal-to-noise ratio. For example, a layer index number of the layer with a large signal-to-noise ratio is reported first while a layer index number of the layer with a small signal-to-noise ratio is reported later; or the layer index number of the layer with a small signal-to-noise ratio is reported first while the layer index number of the layer with a large signal-to-noise ratio is reported later. In a case where the first communication node receives the layer information, the first communication node may determine the signal-to-noise ratio according to the reporting order of the layer index number.

In an embodiment, the layer information includes at least one of: a column vector of a precoding matrix, reference signal received power, reference signal receiving quality, a layer index number, layer received strength, a layer priority or a layer delay.

In an embodiment, the layer information includes a column vector of a precoding matrix. In the space division multiplexing transmission, the transmitted layer signals respectively correspond to the column vectors in the precoding matrix, and the layer information fed back by the second communication node to the first communication node includes the column vectors in the precoding matrix so that the first communication node may accurately obtain a column vector and then analyze the signal transmission on a layer corresponding to the column vector. Since the matrix is capable of being transposed, the vector in the precoding matrix corresponding to the layer may also be expressed as the row vector. The information of the column vector in the precoding matrix is equal to the information of the vector in the precoding matrix corresponding to the layer.

In an embodiment, the layer information includes reference signal received power. The first communication node transmits a reference signal, and the second communication node receives and measures the reference signal and feeds back received power of the reference signal so that the first communication node obtains received power information of the transmitted reference signal and, according to the received power information, compares the strength of received power at each transmission antenna port or compares the received power of the second communication node for each layer signal. The reference signal may be included in the configuration information and then sent to the second communication node.

In an embodiment, the layer information includes reference signal receiving quality. The first communication node transmits a reference signal, and the second communication node receives and measures the reference signal and feeds back receiving quality of the reference signal so that the first communication node obtains the receiving quality of the transmitted reference signal and, according to the receiving quality, compares the receiving quality at each transmission antenna port or compares the receiving quality of the second communication node for each layer signal. The reference signal may be included in the configuration information and then sent to the second communication node.

In an embodiment, the layer information includes a layer index number. The second communication node receives and measures a reference signal transmitted by the first communication node and reports the layer index number to the first communication node so that the first communication node determines a layer selection decision.

In an embodiment, the layer information includes layer received strength. The second communication node receives and measures a reference signal transmitted by the first communication node and reports the layer received strength to the first communication node so that the first communication node determines a layer selection decision.

In an embodiment, the layer information includes a layer priority. The second communication node receives and measures a reference signal transmitted by the first communication node and reports the layer priority to the first communication node so that the first communication node determines a layer selection decision.

In an embodiment, the layer information includes a layer delay. The second communication node receives and measures a reference signal transmitted by the first communication node and reports the layer delay to the first communication node so that the first communication node determines a layer selection decision.

The layer information may also include two or more types described above. For example, the layer information includes a layer priority and a layer delay, and the second communication node reports the layer priority and the layer delay of each layer or a specific layer to the first communication node.

In an embodiment, the layer information includes layer received strength, and that the layer information is fed back to the first communication node includes: layer information of a certain number layers with the highest layer received strength is reported to the first communication node. In this embodiment, the second communication node reports layer information of a certain number of layers with the highest received strength to the first communication node. For example, layer information of one layer with the highest received strength is reported to the first communication node. In another example, layer information of two layers with the highest received strength is reported. The first preset number may be specified by a protocol or configured by the first communication node in the configuration information. Through the reporting of layer information of the first preset number of layers, the layer information of the layer with the highest received strength may be obtained with small resource overhead, and the first communication node knows the layer information and makes a data transmission decision according to the layer information, thereby avoiding using large resource overhead to report the information of all layers and reducing resource occupation.

In an embodiment, the layer information includes a layer delay, and that the layer information is fed back to the first communication node includes: layer information of a second preset number of layers with the lowest layer delay is reported to the first communication node. In this embodiment, the second communication node reports layer information of a certain number of layers with the lowest layer delay to the first communication node. For example, layer information of one layer with the lowest layer delay is reported. In another example, layer information of two layers with the lowest layer delay is reported. The second preset number may be specified by a protocol or configured by the first communication node in the configuration information. Through the reporting of layer information of the second preset number of layers, the layer information of the layer with the lowest layer delay may be obtained with a small resource overhead, thereby reducing resource occupation.

In an embodiment, the layer information includes a layer priority, and that the layer information is fed back to the first communication node includes: layer information of a third preset number of layers with the highest layer priority is reported to the first communication node. In this embodiment, the second communication node reports layer information of a certain number of layers with the highest layer priority to the first communication node. For example, layer information of one layer with the highest layer priority is reported. In another example, layer information of two layers with the highest layer priority is reported. The third preset number may be specified by a protocol or configured by the first communication node in the configuration information. Through the reporting of layer information of the third preset number of layers, the layer information of the layer with the highest layer priority may be obtained with a small resource overhead, thereby reducing resource occupation.

In an embodiment, the layer information includes a layer index number and layer received strength, and that the layer information is fed back to the first communication node includes: a fourth preset number of layer index numbers with the highest layer received strength are reported to the first communication node. In this embodiment, the second communication node reports layer index numbers of a certain number of layers with the highest received strength to the first communication node. For example, a layer index number of one layer with the highest received strength is reported. In another example, layer index numbers of two layers with the highest received strength are reported. The fourth preset number may be specified by a protocol or configured by the first communication node in the configuration information. Through the reporting of the layer information of the fourth preset number of layers, the layer index number of the layer with the highest layer priority may be obtained with a small resource overhead, thereby reducing resource occupation.

In an embodiment, the layer information includes a layer index number and a layer delay, and that the layer information is fed back to the first communication node includes: a fifth preset number of layer index numbers with the lowest layer delay are reported to the first communication node. In this embodiment, the second communication node reports layer index numbers of a certain number of layers with the lowest layer delay to the first communication node. For example, a layer index number of one layer with the lowest layer delay is reported. In another example, layer index numbers of two layers with the lowest layer delay are reported. The fifth preset number may be specified by a protocol or configured by the first communication node in the configuration information. Through the reporting of layer information of the fifth preset number of layers, the layer index number of the layer with the lowest layer delay may be obtained with a small resource overhead, thereby reducing resource occupation.

In an embodiment, the layer information includes a layer index number and a layer priority, and that the layer information is fed back to the first communication node includes: a sixth preset number of layer index numbers with the highest layer priority are reported to the first communication node. In this embodiment, the second communication node reports layer index numbers of a certain number of layers with the highest layer priority to the first communication node. For example, a layer index number of one layer with the highest layer priority is reported. In another example, layer index numbers of two layers with the highest layer priority are reported. The sixth preset number may be specified by a protocol or configured by the first communication node in the configuration information. Through the reporting of layer information of the sixth preset number of layers, the layer index number of the layer with the lowest layer delay may be obtained with a small resource overhead, thereby reducing resource occupation.

In an embodiment, the layer information includes at least one of: a layer used for a phase tracking reference signal, a layer used for a positioning reference signal, a beam with minimum strength or an antenna port with minimum strength.

In an embodiment, the second communication node suggests a layer used for a phase tracking reference signal to the first communication node so that the first communication node selects a layer for transmitting the phase tracking reference signal.

In an embodiment, the second communication node suggests a layer used for a positioning reference signal to the first communication node so that the first communication node selects a layer for transmitting the positioning reference signal.

In an embodiment, the second communication node suggests a beam with minimum strength to the first communication node. In this embodiment, a precoding vector on a layer is composed of beams, and through the reporting of the beam with minimum strength, the first communication node selects a second communication node, a third communication node or the like with the least mutual interference for multi-user transmission.

In an embodiment, the second communication node suggests an antenna port with minimum strength to the first communication node so that the first communication node selects a second communication node, a third communication node or the like with the least mutual interference for multi-user transmission, thereby improving the communication efficiency.

In an embodiment, the layer information includes a target layer having a set attribute. In this embodiment, the second communication node feeds back a target layer having a set attribute to the first communication node. For example, the second communication node feeds back a target layer whose layer delay is less than a first threshold to the first communication node. In another example, the second communication node feeds back a target layer whose layer received strength is greater than a second threshold to the first communication node. The set attribute may be specified by a protocol or configured by the first communication node or configured by the second communication node.

In an embodiment, that the layer information is fed back to the first communication node includes: a target layer having a set attribute is indicated to the first communication node by bit mapping.

In this embodiment, a layer having a set attribute under any combination is concisely and clearly indicated to the first communication node by bit mapping. For example, a layer with the highest received strength is indicated by bit mapping. In another example, a layer with the smallest delay is indicated by bit mapping. In another example, a layer having the least interference is indicated by bit mapping. In another example, a layer with the highest priority is indicated by bit mapping. For example, the number of layers having a set attribute may be determined by the second communication node, and the second communication node indicates multiple layers having a set attribute by bit mapping. The indicated multiple layers have an approximately equivalent set attribute. For example, if the second communication node indicates three layers with the highest received strength by bit mapping, the three layers may be respectively taken as the layer with the highest received strength for the first communication node to make decisions.

In an embodiment, the set attribute includes at least one of: set received strength, a set delay, set interference or a set priority. In this embodiment, the set attribute may be set layer received strength, which means that the layer indicated in the layer information is a layer satisfying the set received strength, for example, the set layer received strength is greater than a third threshold value, or the set layer received strength is between a fourth threshold and a fifth threshold, or the set layer received strength is less than a sixth threshold. The set attribute may be a set delay, and the layer indicated in the layer information is a layer satisfying the set delay. The set attribute may be set interference, and the layer indicated in the layer information is a layer satisfying the set interference. The set attribute may be a set priority, and the layer indicated in the layer information is a layer satisfying the set priority. The set attribute may include two or more than two of the set received strength, the set delay, the set interference or the set priority described above. For example, if the set attribute includes set received strength and a set delay, the layer indicated in the layer information is a layer satisfying the set received strength and the set delay.

In an embodiment, the bit width of the bit mapping is a rank, and the rank is the number of layers of the first communication node. In this embodiment, the bit width of the bit mapping is a rank so that any possible combination of layers having a set attribute may be indicated in the layer information, and no additional resource overhead is required.

In an embodiment, the number of target layers having a set attribute is determined according to the rank, the number of the target layers having a set attribute is less than the rank, and the rank is the number of layers of the first communication node. In this embodiment, the number of target layers is determined according to the rank, the number of target layers is less than the rank, and the number of target layers corresponding to a larger rank is greater than or equal to the number of target layers corresponding to a smaller rank. For example, if the rank is 3, the number of target layers is 2; if the rank is 4, the number of target layers is greater than or equal to 2 and less than 4, which means that the number of target layers may be 2 or 3.

Table 1 is a mapping relationship table between the number of target layers and the rank according to an embodiment. In this embodiment, if the rank is 1, the corresponding number of target layers is 0; if the rank is 2, the corresponding number of target layers is 1; if the rank is 3, the corresponding number of target layers is 1; if the rank is 4, the corresponding number of target layers is 1.

TABLE 1

Mapping relationship table between the rank and the number of target layers

| Rank | 1 | 2 | 3 | 4 |
|---|---|---|---|---|
| Target layer number | 0 | 1 | 1 | 1 |

Table 2 is another mapping relationship table between the number of target layers and the rank according to an embodiment. In this embodiment, if the rank is 1, the corresponding number of target layers is 0; if the rank is 2, the corresponding number of target layers is 1; if the rank is 3, the corresponding number of target layers is 1; if the rank is 4, the corresponding number of target layers is 2.

TABLE 2

Mapping relationship table between the rank and the number of target layers

| Rank | 1 | 2 | 3 | 4 |
|---|---|---|---|---|
| Target layer number | 0 | 1 | 1 | 2 |

Table 3 is another mapping relationship table between the number of target layers and the rank according to an embodiment. In this embodiment, if the rank is 1, the corresponding number of target layers is 0; if the rank is 2, the corresponding number of target layers is 1; if the rank is 3, the corresponding number of target layers is 2; if the rank is 4, the corresponding number of target layers is 2.

TABLE 3

Mapping relationship table between the rank and the number of target layers

| Rank | 1 | 2 | 3 | 4 |
|---|---|---|---|---|
| Target layer number | 0 | 1 | 2 | 2 |

In an embodiment, that the layer information is fed back to the first communication node includes: a target layer having a set attribute is indicated to the first communication node by a bit combination state. In this embodiment, through the indicating of the target layer having a set attribute by the bit combination state, the bit overhead can be saved in a case where the number of layers having a set attribute is determined.

In an embodiment, the bit combination state is represented based on a preset number of bits, the number of bit combination states formed by the preset number of bits is greater than or equal to the rank, and the rank is the number of layers of the first communication node.

In this embodiment, the number of bits in the bit combination state is determined according to rank. In a case where the number of to-be-fed-back target layers having a set attribute is 1, the number of bit combination states is greater than or equal to the rank so that the bit combination state is sufficient to indicate all target layers. For example, the number of target layers is 1, there are three possibilities for the target layer in the case where the rank is 3, and the number of bits is at least 2 (there are at most four combination states), so as to sufficiently represent all possibilities. In another example, the number of target layers is 1, there are two possibilities for the target layer in the case where the rank is 2, and the number of bits is at least 1 (there are at most two combination states), so as to sufficiently represent all possibilities.

In an embodiment, the number of bits in the bit combination state is determined according to the rank and the number of target layers. In a case where the number of target layers is greater than 1, the number of bit combination states satisfies: the number of bit combination states is greater than or equal to all possible numbers of the target layers indicated from the rank. For example, if the rank is 3 and the number of target layers is 2, two layers with a set attribute are indicated from the three layers, there are three possibilities, and all possibilities may be represented with two combination states (there are at most four combined states). In another example, if the rank is 4 and the number of target layers is 2, two layers with a set attribute are indicated from the four layers, there are six possibilities, and all possibilities may be represented with three combination states (there are at most eight combined states).

TABLE 4

Mapping relationship table between the rank and the preset numbers of bits

| Rank | 1 | 2 | 3 | 4 |
|---|---|---|---|---|
| Bit preset number | 0 | 1 | 2 | 2 |

Table 4 is a mapping relationship table between the number of bits and the rank according to an embodiment. In this embodiment, if the rank is 1, the corresponding preset number of bits is 0; if the rank is 2, the corresponding preset number of bits is 1; if the rank is 3, the corresponding preset number of bits is 2; if the rank is 4, the corresponding preset number of bits is 2.

Table 5 is another mapping relationship table between the number of bits and the rank according to an embodiment. In this embodiment, if the rank is 1, the corresponding preset number of bits is 0; if the rank is 2, the corresponding preset number of bits is 1; if the rank is 3, the corresponding preset number of bits is 2; if the rank is 4, the corresponding preset number of bits is 3.

TABLE 5

Mapping relationship table between the rank and the preset number of bits

| Rank | 1 | 2 | 3 | 4 |
|---|---|---|---|---|
| Bit preset number | 0 | 1 | 2 | 3 |

In an embodiment, target layers in the layer information have an equivalent set attribute. In this embodiment, the layers indicated by the second communication node in the layer information have an equivalent (approximately equivalent, with a certain difference actually) set attribute so that the first communication node makes a layer selection decision in a wider range, and the layers in the range have an approximately equivalent set attribute. For example, the second communication node indicates two layers having an approximately equivalent set attribute (for example, having equivalent layer received strength and/or an equivalent layer delay) so that the first communication node makes a selection in the two layers. For example, the second communication node indicates four layers having an approximately equivalent set attribute so that the first communication node makes a selection in the four layers. The number of target layers may also be only one, which means that the second communication node indicates one layer having an approximately equivalent set attribute, and the first communication node makes a selection in the one layer.

In this embodiment, the equivalence condition may be predetermined by a protocol, configured by the first communication node, or determined by the second communication node and reported to the first communication node. For example, the second communication node determines the equivalence condition as the presence of at least one layer whose received strength is within a set received strength range, determines the at least one layer to have an equivalent set attribute, reports the at least one layer to the first communication node, and reports the equivalent condition so that the first communication node knows that the at least one layer has an equivalent set attribute because the received strength of the at least one layer is within a set received strength range.

In an embodiment, the layer indicated by the second communication node may have equivalent layer received strength, equivalent maximum strength, an equivalent delay or an equivalent minimum delay.

In an embodiment, a layer in the layer information is identified by the first communication node as the layer having an equivalent set attribute. In this embodiment, it is assumed that the layer indicated by the second communication node has an equivalent set attribute (in fact, the layer indicated by the second communication node may not have an equivalent set attribute) so that the first communication node performs layer selection and decision in a wider range. For example, the second communication node indicates two layers that are identified by the first communication node as the layer having an equivalent set attribute, and the first communication node may make a selection in the two layers and assume that the two layers have an equivalent set attribute. For example, the second communication node indicates four layers having an equivalent set attribute, which are identified by the first communication node as the layer having an equivalent set attribute, and the first node may make a selection in the four layers and assume that the four layers have an equivalent set attribute. The number of target layers having an equivalent set attribute may also be one, which means that the second communication node indicates one layer that is identified by the first communication node as the layer having an equivalent set attribute, and the first node may make a selection in the one layer and assume that the one layer has an equivalent set attribute.

In an embodiment, the layer indicated by the second communication node may be identified by the first communication node as the layer having equivalent layer received strength, may be identified by the first communication node as the layer having equivalent maximum strength, may be identified by the first communication node as the layer having an equivalent delay, or may be identified by the first communication node as the layer having an equivalent minimum delay.

In an embodiment, the layer information is identified by the first communication node as layer information that is reported in order of layer received strength. In this embodiment, the first communication node assumes that the layers reported by the second communication node are reported in order of layer received strength (in fact, the layers reported by the second communication node may not be reported in order of layer received strength) so that the received strength of each layer may be assumed according to the reporting order of layer information.

In an embodiment, the layer information includes layer received strength, and that the layer information is fed back to the first communication node includes: a layer with the highest layer received strength is taken as a layer that is the first to be reported to the first communication node. In this embodiment, a layer with the highest received strength is reported first, and layer information corresponding to the layer with the highest received strength has a priority in transmission, so that the first communication node determines the layer with the highest received strength.

In an embodiment, the layer information is identified by the first communication node as that the layer that is the first to be reported is the layer with the highest received strength. In this embodiment, it is assumed that the layer with the highest received strength is reported first (in fact, the layer that is the first to be reported may not be the layer with the highest received strength), and in a case where the first communication node receives the layer information, the first communication node identifies the layer that is reported first in the layer information as the layer with the highest received strength.

In an embodiment, the transmission rank order is configured by the first communication node. In this embodiment, the transmission order of the layer information is configured by the first communication node. For example, the first communication node configures the layer information to be reported in order of layer received strength from high to low. In another example, the first communication node configures the layer index number of the layer information to be reported in order of layer delay from small to large. In another example, the first communication node configures the layer that is the first to be reported in the layer information as the layer with the highest layer received strength. The transmission rank order may be included in the configuration information and then transmitted to the second communication node, and the second communication node may determine the transmission rank order according to the configuration information and/or the layer information.

In an embodiment, the layer information includes a transmission rank order. In this embodiment, the second communication node reports the transmission rank order to the first communication node so that the first communication node is informed or makes a decision.

In an embodiment, the configuration information includes second-type information, and that layer information of the first communication node is determined according to the configuration information includes: the layer information of the first communication node is determined according to the second-type information, where the second-type information includes at least one of: a codebook type, a frequency band or a layer reporting order configuration item.

In an embodiment, the layer information includes at least one of: an inclusion state for an indication of a layer with the highest layer received strength, an inclusion state for an indication of a layer with the smallest layer delay or an inclusion state for indication of a target layer having a set attribute, where the inclusion state includes: inclusion or exclusion.

In an embodiment, the layer information is determined according to the codebook type. For example, it is determined according to the codebook type whether the layer information includes an indication of a layer with the highest received strength. In another example, it is determined according to the codebook type whether the layer information includes an indication of a layer delay. In another example, it is determined according to the codebook type whether the layer information includes an indication of the layer having a set attribute.

In an embodiment, the layer information is determined according to the frequency band. For example, it is determined according to the frequency band whether the layer information includes an indication of a layer with the highest received strength. In another example, it is determined according to the frequency band whether the layer information includes an indication of a layer delay. In another example, it is determined according to the frequency band whether the layer information includes an indication of the layer having a set attribute.

In an embodiment, the layer information is determined according to the layer reporting order configuration item. For example, it is determined according to the layer reporting order configuration item whether the layer information includes an indication of a layer with the highest received strength. In another example, it is determined according to the layer reporting order configuration item whether the layer information includes an indication of a layer delay. In another example, it is determined according to the layer reporting order configuration item whether the layer information includes an indication of the layer having a set attribute.

In an embodiment, the configuration information includes third-type information, and that layer information of the first communication node is determined according to the configuration information includes: the layer information of the first communication node is determined according to the third-type information, where the third-type information includes at least one of: a layer reporting order configuration item, a layer reporting order configured by the layer reporting order configuration item, an enabling state of the layer reporting order configuration item or an enabling state of the layer reporting order configuration item for the layer reporting order.

In this embodiment, the layer information may also be determined according to the presence or absence of the layer reporting order configuration item; the layer information may also be determined according to the layer reporting order configured by the layer reporting order configuration item; the layer information may also be determined according to whether the layer reporting order configuration item is enabled; or the layer information may also be determined according to whether the layer reporting order configuration item enables the layer reporting order.

In an embodiment, the target layer having a set attribute is configured by the first communication node.

In an embodiment, that the target layer having a set attribute is configured by the first communication node includes at least one of the following: the set attribute is configured by the first communication node; the number of target layers having a set attribute is configured by the first communication node; or the number of bits indicating the target layer having a set attribute is configured by the first communication node. For example, the first communication node configured the content included in the set attribute, and the content may be that the layer received strength is greater than a certain threshold. In another example, the first communication node configures the number of target layers having a set attribute to be fed back or reported in the layer information, and the number of target layers to be fed back may be configured to be 1. In another example, the first communication node configures the number of bits indicating the target layer in the layer information, and the target layer may be configured to be indicated by 2 bits.

In an embodiment, the configuration information includes a first configuration item and a second configuration item, and the first configuration item has an association relationship with the second configuration item; where the first configuration item is configured to configure a target layer having a set attribute, and the second configuration item is configured to configure a layer reporting order.

In this embodiment, the association relationship includes at least one of the following: the first configuration item is enabled while the second configuration item is not enabled; the first configuration item is not enabled while the second configuration item is enabled; or the first configuration item is not enabled and the second configuration item is not enabled.

For example, a configuration item indicating a target layer having a set attribute is enabled while a configuration item indicating a layer reporting order is not enabled. In another example, a configuration item indicating a layer having a specific attribute is not enabled while a configuration item indicating a layer reporting order is enabled. In another example, a configuration item indicating a layer having a specific attribute is not enabled, and a configuration item indicating a layer reporting order is not enabled.

In an embodiment, the configuration information includes at least one of a first configuration item or a second configuration item, where the first configuration item is configured to configure a target layer having a set attribute, and the second configuration item is configured to configure a layer report order.

In an embodiment, the configuration information is determined according to fourth-type information, where the fourth-type information includes at least one of: a protocol version number, a capability of a current communication node or a frequency band of the current communication node. For example, it is determined according to the protocol version number that the configuration information includes a first configuration item, or the configuration information includes a second configuration item, or the configuration information includes both a first configuration item and a second configuration item. In another example, it is determined according to the capability of the current communication node (the second communication node) that the configuration information includes a first configuration item, or the configuration information includes a second configuration item, or the configuration information includes both a first configuration item and a second configuration item. In another example, it is determined according to the frequency band of the current communication node (the second communication node) that the configuration information includes a first configuration item, or the configuration information includes a second configuration item, or the configuration information includes both a first configuration item and a second configuration item.

In this embodiment, a communication node for transmitting multi-layer signals is taken as the first communication node, a communication node for receiving the multi-layer signals is taken as the second communication node, and the second communication node feeds back layer information to the first communication node to indicate the relevant transmission performance of each layer, so that the first communication node can make full use of each layer to make an efficient data transmission decision, thereby improving the communication efficiency and reliability.

Figure 3:
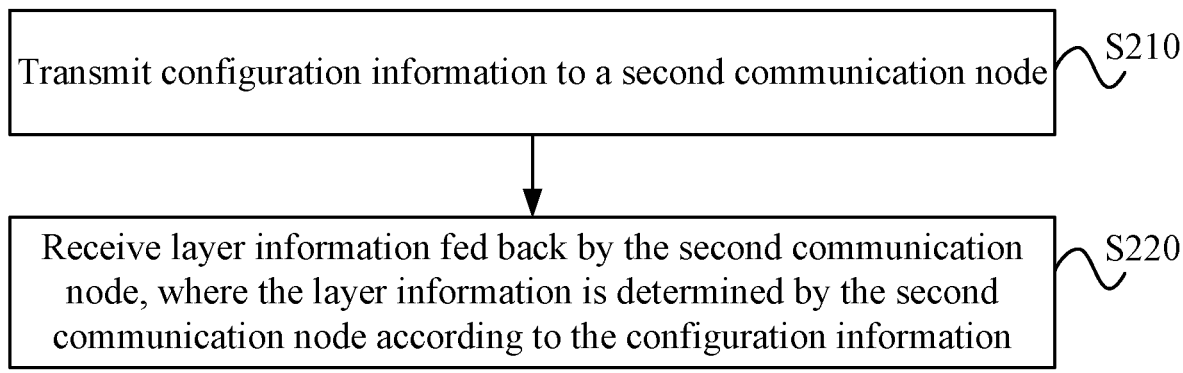
FIG. 3 is a flowchart of a method for receiving layer information according to an embodiment.

An embodiment of the present application further provides a method for receiving layer information. FIG. 3 is a flowchart of a method for receiving layer information according to an embodiment. As shown in FIG. 3, the method for receiving layer information provided by this embodiment is applied to a first communication node and includes S210 and S220.

In S210, configuration information is transmitted to a second communication node.

In S220, layer information fed back by the second communication node is received, where the layer information is determined by the second communication node according to the configuration information.

In an embodiment, the method further includes: in a case where the layer information fed back by the second communication node is received, a transmission scheme of space division multiplexing is determined according to the layer information. For example, according to the layer information, data is transmitted using a certain number of layers with the highest layer received strength. In another example, according to the layer information, data is transmitted at target layers having the same layer delay.

In an embodiment, the method further includes: in a case where the layer information fed back by the second communication node is received, a transmission characteristic of a layer is determined according to the layer information, where the transmission characteristic includes at least one of: reference signal received power, reference signal receiving quality, a layer delay, a layer priority, a layer index number, layer received strength, a layer used for a phase tracking reference signal, a layer used for a positing reference signal, a beam with minimum strength, an antenna port with minimum strength or a transmission rank order. In this embodiment, the first communication node determines the transmission characteristic of the layer according to the layer information and makes a data transmission decision of space division multiplexing according to the transmission characteristic.

In an embodiment, the method further includes: a target layer having a set attribute in the layer information is identified as a layer having an equivalent set attribute.

In an embodiment, the method further includes: the layer information is identified as layer information that is reported in order of layer received strength.

In an embodiment, the method further includes: the layer information is identified as that a layer that is the first to be reported is a layer with the highest received strength.

In an embodiment, the method further includes: at least one of the following is configured through a current communication node (the first communication node): configuration information, a set attribute, a transmission rank order of layer information, the number of target layers having a set attribute to be fed back or reported in the layer information, the number of bits indicating the target layer in the layer information, a first configuration item, a second configuration item, second-type information or third-type information. The second-type information includes at least one of: a codebook type, a frequency band or a layer reporting order configuration item. The third-type information includes at least one of: a layer reporting order configuration item, a layer reporting order configured by the layer reporting order configuration item, an enabling state of the layer reporting order configuration item or an enabling state of the layer reporting order configuration item for the layer reporting order.

In this embodiment, a communication node for transmitting multi-layer signals is taken as the first communication node, a communication node for receiving the multi-layer signals is taken as the second communication node, and layer information fed back by the second communication node is received through the first communication node so that the first communication node knows the relevant transmission performance of each layer and then makes full use of each layer to make an efficient data transmission decision, thereby improving the communication efficiency and reliability. The method for receiving layer information provided by this embodiment and the method for feeding back layer information belong to the same concept and have the same effects. For technical details not described in detail in this embodiment, reference may be made to any one of the embodiments described above.

Figure 4:
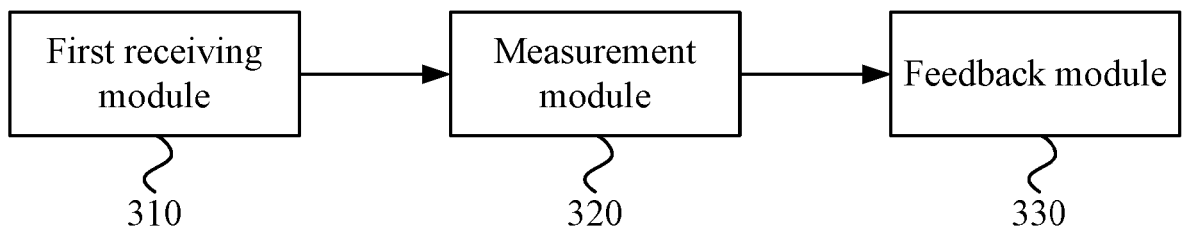
FIG. 4 is a structural schematic diagram of an apparatus for feeding back layer information according to an embodiment.

An embodiment of the present application further provides an apparatus for feeding back layer information. FIG. 4 is a structural schematic diagram of an apparatus for feeding back layer information according to an embodiment. As shown in FIG. 4, the apparatus for feeding back layer information provided by this embodiment includes a first receiving module 310, a measurement module 320, and a feedback module 330.

The first receiving module 310 is configured to receive configuration information of a first communication node. The measurement module 320 is configured to determine layer information of the first communication node according to the configuration information. The feedback module 330 is configured to feed back the layer information to the first communication node.

The apparatus for feeding back layer information provided by this embodiment feeds back the layer information to a first communication node to indicate the relevant transmission performance of each layer so that the first communication node can make full use of each layer to make an efficient data transmission decision, thereby improving the communication efficiency and reliability.

In an embodiment, the apparatus further includes a rank order determination module, which is configured to determine a transmission rank order according to the layer information.

In an embodiment, the layer information includes layer received strength, and the transmission rank order includes at least one of: a layer reporting order, an order of layers in a reporting sequence, a layer priority or a layer index number.

In an embodiment, the layer information includes a layer delay, and the transmission rank order includes at least one of: a layer reporting order, an order of layers in a reporting sequence, a layer priority or a layer index number.

In an embodiment, the layer information includes a layer priority. The transmission rank order includes at least one of: a layer reporting order, an order of layers in a report sequence or a layer index number.

In an embodiment, the layer information includes a layer index number, and the transmission rank order includes at least one of: a layer reporting order, an order of layers in a reporting sequence or a layer priority.

In an embodiment, the rank order determination module is specifically configured to: in a case where the first communication node has at least two layers, order the layers in ascending order according to the layer information to obtain the transmission rank order; or in a case where the first communication node has at least two layers, order the layers in descending order according to the layer information to obtain the transmission rank order.

In an embodiment, the rank order determination module is specifically configured to: determine the transmission rank order according to a configuration order of the layer index number; or determine the transmission rank order according to a reporting order of the layer index number.

In an embodiment, the layer information includes first-type information and a layer index number, and the transmission rank order includes a reporting order of the layer index number.

In an embodiment, the rank order determination module is specifically configured to: in a case where the first communication node has at least two layers, order the layers in descending order according to the first-type information to obtain the reporting order of the layer index number.

In an embodiment, the first-type information includes at least one of: layer received strength, layer received power, an SINR or a layer signal-to-noise ratio.

In an embodiment, the layer information includes at least one of: a column vector of a precoding matrix, reference signal received power, reference signal receiving quality, a layer index number, layer received strength, a layer priority or a layer delay.

In an embodiment, the layer information includes layer received strength, and the feedback module 330 is specifically configured to report layer information of the first preset number of layers with the highest layer received strength to the first communication node.

In an embodiment, the layer information includes a layer delay, and the feedback module 330 is specifically configured to report layer information of the second preset number of layers with the lowest layer delay to the first communication node.

In an embodiment, the layer information includes a layer priority, and the feedback module 330 is specifically configured to report layer information of the third preset number of layers with the highest layer priority to the first communication node.

In an embodiment, the layer information includes a layer index number and layer received strength, and the feedback module 330 is specifically configured to report a fourth preset number of layer index numbers with the highest layer received strength to the first communication node.

In an embodiment, the layer information includes a layer index number and a layer delay, and the feedback module 330 is specifically configured to report a fifth preset number of layer index numbers with the lowest layer delay to the first communication node.

In an embodiment, the layer information includes a layer index number and a layer priority, and the feedback module 330 is specifically configured to report a sixth preset number of layer index numbers with the highest layer priority to the first communication node.

In an embodiment, the layer information includes at least one of: a layer used for a phase tracking reference signal, a layer used for a positioning reference signal, a beam with minimum strength or an antenna port with minimum strength.

In an embodiment, the layer information includes a target layer having a set attribute.

In an embodiment, the feedback module 330 is specifically configured to indicate a target layer having a set attribute to the first communication node by bit mapping.

In an embodiment, the set attribute includes at least one of: set received strength, a set delay, set interference or a set priority.

In an embodiment, the bit width of the bit mapping is a rank, and the rank is the number of layers of the first communication node.

In an embodiment, the number of target layers having a set attribute is determined according to the rank, the number of the target layers having a set attribute is less than the rank, and the rank is the number of layers of the first communication node.

In an embodiment, the feedback module 330 is specifically configured to indicate a target layer having a set attribute to the first communication node by a bit combination state.

In an embodiment, the bit combination state is represented based on a preset number of bits, the number of bit combination states formed by the preset number of bits is greater than or equal to the rank, and the rank is the number of layers of the first communication node.

In an embodiment, target layers in the layer information have an equivalent set attribute.

In an embodiment, a layer in the layer information is identified by the first communication node as the layer having an equivalent set attribute.

In an embodiment, the layer information is identified by the first communication node as layer information that is reported in order of layer received strength.

In an embodiment, the layer information includes layer received strength, and the feedback module 330 is specifically configured to take a layer with the highest layer received strength as a layer that is the first to be reported to the first communication node.

In an embodiment, the layer information is identified by the first communication node as that the layer that is the first to be reported is the layer with the highest received strength.

In an embodiment, the transmission rank order is configured by the first communication node.

In an embodiment, the layer information includes a transmission rank order.

In an embodiment, the configuration information includes second-type information, and the measurement module 320 is configured to determine the layer information of the first communication node according to the second-type information, where the second-type information includes at least one of: a codebook type, a frequency band or a layer reporting order configuration item.

In an embodiment, the layer information includes at least one of: an inclusion state for an indication of a layer with the highest layer received strength, an inclusion state for an indication of a layer with the smallest layer delay or an inclusion state for indication of a target layer having a set attribute, where the inclusion state includes: inclusion or exclusion.

In an embodiment, the configuration information includes third-type information, and the measurement module 320 is configured to determine the layer information of the first communication node according to the third-type information, where the third-type information includes at least one of: a layer reporting order configuration item, a layer reporting order configured by the layer reporting order configuration item, an enabling state of the layer reporting order configuration item or an enabling state of the layer reporting order configuration item for the layer reporting order.

In an embodiment, the target layer having a set attribute is configured by the first communication node.

In an embodiment, that the target layer having a set attribute is configured by the first communication node includes at least one of the following: the set attribute is configured by the first communication node; the number of target layers having a set attribute is configured by the first communication node; or the number of bits indicating the target layer having a set attribute is configured by the first communication node.

In an embodiment, the configuration information includes a first configuration item and a second configuration item, and the first configuration item has an association relationship with the second configuration item; where the first configuration item is configured to configure a target layer having a set attribute, and the second configuration item is configured to configure a layer reporting order.

In an embodiment, the association relationship includes at least one of the following: the first configuration item is enabled while the second configuration item is not enabled; the first configuration item is not enabled while the second configuration item is enabled; or the first configuration item is not enabled and the second configuration item is not enabled.

In an embodiment, the configuration information includes at least one of a first configuration item or a second configuration item, where the first configuration item is configured to configure a target layer having a set attribute, and the second configuration item is configured to configure a layer report order.

In an embodiment, the apparatus further includes a configuration information determination module, which is configured to determine the configuration information according to fourth-type information, where the fourth-type information includes at least one of: a protocol version number, a capability of a current communication node or a frequency band of the current communication node.

The apparatus for feeding back layer information provided by this embodiment and the method for feeding back layer information belong to the same concept and have the same effects. For technical details not described in detail in this embodiment, reference may be made to any one of the embodiments described above.

Figure 5:
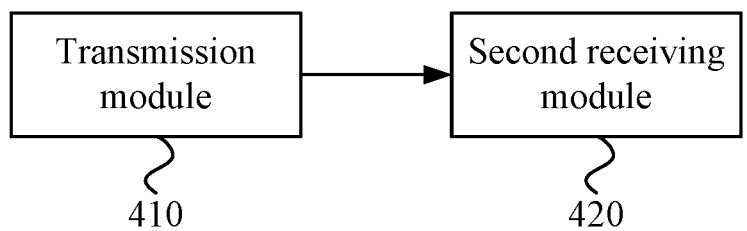
FIG. 5 is a structural schematic diagram of an apparatus for receiving layer information according to an embodiment.

An embodiment of the present application further provides an apparatus for receiving layer information. FIG. 5 is a structural schematic diagram of an apparatus for receiving layer information according to an embodiment. As shown in FIG. 5, the apparatus for receiving layer information provided by this embodiment includes a transmission module 410 and a second receiving module 420.

The transmission module 410 is configured to transmit configuration information to a second communication node. The second receiving module 420 is configured to receive layer information fed back by the second communication node, where the layer information is determined by the second communication node according to the configuration information.

The apparatus for receiving layer information provided by this embodiment, after receiving the layer information fed back by the second communication node, knows the relevant transmission performance of each layer and thus makes full use of each layer to make an efficient data transmission decision, thereby improving the communication efficiency and reliability.

In an embodiment, the apparatus further includes a decision module, which is configured to: in a case where the layer information fed back by the second communication node is received, determine a transmission scheme of space division multiplexing according to the layer information.

In an embodiment, the apparatus further includes a transmission characteristic determination module, which is configured to: in a case where the layer information fed back by the second communication node is received, determine a transmission characteristic of a layer according to the layer information, where the transmission characteristic includes at least one of: reference signal received power, reference signal receiving quality, a layer delay, a layer priority, a layer index number, layer received strength, a layer used for a phase tracking reference signal, a layer used for a positing reference signal, a beam with minimum strength, an antenna port with minimum strength or a transmission rank order.

In an embodiment, the apparatus further includes a first identification module, which is configured to identify a target layer having a set attribute in the layer information as a layer having an equivalent set attribute.

In an embodiment, the apparatus further includes a second identification module, which is configured to identify the layer information as layer information that is reported in order of layer received strength.

In an embodiment, the apparatus further includes a third identification module, which is configured to identify the layer information as that a layer that is the first to be reported is a layer with the highest received strength.

In an embodiment, the apparatus further includes a configuration module, which is configured to configure at least one of: configuration information, a set attribute, a transmission rank order of layer information, the number of target layers having a set attribute to be fed back or reported in the layer information, the number of bits indicating the target layer in the layer information, a first configuration item, a second configuration item, second-type information or third-type information. The second-type information includes at least one of: a codebook type, a frequency band or a layer reporting order configuration item. The third-type information includes at least one of: a layer reporting order configuration item, a layer reporting order configured by the layer reporting order configuration item, an enabling state of the layer reporting order configuration item or an enabling state of the layer reporting order configuration item for the layer reporting order.

The apparatus for receiving layer information provided by this embodiment and the method for receiving layer information belong to the same concept and have the same effects. For technical details not described in detail in this embodiment, reference may be made to any one of the embodiments described above.

An embodiment of the present application further provides a communication node. The method for feeding back layer information may be executed by an apparatus for feeding back layer information, and the apparatus for feeding back layer information may be implemented by software and/or hardware and integrated on the communication node. The method for receiving layer information may be executed by an apparatus for receiving layer information, and the apparatus for receiving layer information may be implemented by software and/or hardware and integrated on the communication node. The communication node may be a base station or a user terminal.

Figure 6:
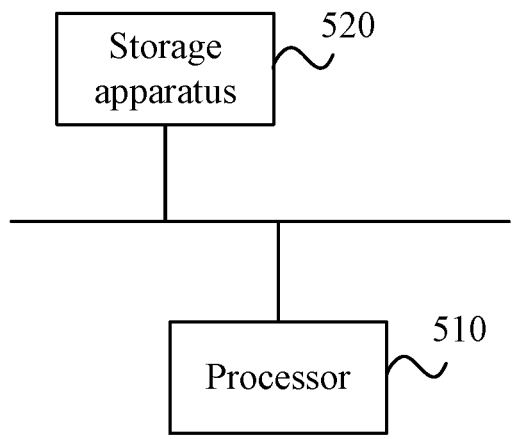
FIG. 6 is a structural schematic diagram of a communication node according to an embodiment.

FIG. 6 is a structural schematic diagram of a communication node according to an embodiment. As shown in FIG. 6, the communication node provided by this embodiment includes a processor 510 and a storage apparatus 520. The number of processors in the communication node may be one or more, and FIG. 6 shows one processor 510 by way of example. The processor 510 and the storage apparatus 42 in the communication node may be connected via a bus or in other manners, and FIG. 6 shows the connection via a bus by way of example.

The one or more programs, when executed by the one or more processors, enable the one or more processors to implement the method for feeding back layer information or the method for receiving layer information of any one of the embodiments described above.

As a computer-readable storage medium, the storage apparatus 520 in the communication node may be configured to store one or more programs. The programs may be software programs, computer executable programs and modules thereof, such as program instructions/modules corresponding to the method for feeding back layer information in the embodiments of the present application (for example, modules in the apparatus for feeding back layer information shown in FIG. 4, including the first receiving module 310, the measurement module 320, and the feedback module 330). The processor 510 runs the software programs, instructions and modules stored in the storage apparatus 520 to execute function applications and data processing of the communication node, that is, to implement the method for feeding back layer information or the method for receiving layer information in the method embodiments described above.

The storage apparatus 520 may include a program storage area and a data storage area. The program storage area may store an operating system and an application program required by at least one function. The data storage area may store data created depending on the use of a device (for example, layer information and configuration information in the above embodiments). Additionally, the storage apparatus 520 may include a high-speed random-access memory, and may further include a non-volatile memory such as at least one storage device, a flash memory or other non-volatile solid-state memories. In some examples, the storage apparatus 520 may include memories which are remotely disposed with respect to the processors 510. These remote memories may be connected to the terminal via a network. The examples of the preceding network include, but are not limited to, the Internet, an intranet, a local area network, a mobile communication network, and a combination thereof.

When the one or more programs included in the communication node are executed by the one or more processors 510, the method for feeding back layer information or the method for receiving layer information of any one of the embodiments described above is implemented.

The communication node provided by this embodiment and the method for feeding back layer information or the method for receiving layer information provided by any one of the embodiments described above belong to the same concept. For technical details not described in detail in this embodiment, reference may be made to any one of the embodiments described above. This embodiment has the same effects as the execution of the method for feeding back layer information or the method for receiving layer information.

An embodiment of the present disclosure further provides a storage medium including computer executable instructions. The storage medium is configured to store a computer program which, when executed by a processor, implements the method for feeding back layer information or the method for receiving layer information of any one of the embodiments described above.

Through the description of the embodiments described above, it is understood that the present application may be implemented by software plus a general-purpose hardware, or may be implemented by hardware. Based on such an understanding, the technical solutions of the present application may be embodied in the form of a software product. The software product may be stored in a computer-readable storage medium, such as a floppy disk, a read-only memory (ROM), a random-access memory (RAM), a flash, a hard disk or an optical disk, and includes several instructions for enabling a computer device (which may be a personal computer, a server or a network device) to execute the method provided by any one of the embodiments of the present application.

The above are only exemplary embodiments of the present application and are not intended to limit the scope of the present application.

A block diagram of any logic flow in drawings of the present application may represent program steps, or interconnected logic circuits, modules, and functions, or a combination of program steps and logic circuits, modules and functions. The computer programs may be stored in a memory. The memory may be in any type suitable for the local technical environment and may be implemented using any suitable data storage technology, for example, but not limited to, a read-only memory (ROM), a random-access memory (RAM), and an optical memory apparatus and system (a Digital Video Disc (DVD) or a compact disc (CD)). The computer-readable storage medium may include a non-transitory storage medium. The data processor may be of any type suitable to the local technical environment, such as, but is not limited to, a general-purpose computer, a special purpose computer, a microprocessor, a digital signal processor (DSP), an application-specific integrated circuit (ASIC), a field-programmable gate array (FPGA), and a processor based on a multi-core processor architecture.

What is claimed is:

1. A method for feeding back layer information, comprising:
   receiving configuration information of a first communication node;
   determining layer information of the first communication node according to the configuration information; and
   feeding back the layer information to the first communication node;
   determining a transmission rank order according to the layer information;
   wherein the layer information comprises layer received strength, a layer delay and a layer index number; and
   the transmission rank order comprises at least one of: a layer reporting order, an order of layers in a reporting sequence, a layer priority or a layer index number or
   the transmission rank order comprises at least one of: a layer reporting order, an order of layers in a reporting sequence or a layer priority;
   wherein the determining a transmission rank order according to the layer information comprises at least one of the following:
   determining the transmission rank order according to a configuration order of the layer index number; or
   determining the transmission rank order according to a reporting order of the layer index number;
   wherein the feeding back the layer information to the first communication node comprises:
   reporting layer information of a second preset number of layers with a lowest layer delay to the first communication node.

2. The method of claim 1, wherein the layer information further comprises at least one of: a column vector of a precoding matrix, reference signal received power, reference signal receiving quality, or a layer priority.

3. The method of claim 1, wherein the feeding back the layer information to the first communication node further comprises:
   reporting layer information of a first preset number of layers with a highest layer received strength to the first communication node.

4. The method of claim 1, wherein the layer information further comprises a layer priority; and
wherein the feeding back the layer information to the first communication node further comprises:
reporting layer information of a third preset number of layers with a highest layer priority to the first communication node.

5. The method of claim 1, wherein the feeding back the layer information to the first communication node further comprises:
reporting layer index numbers of a fourth preset number of layers with highest layer received strength to the first communication node.

6. The method of claim 1, wherein the feeding back the layer information to the first communication node further comprises:
reporting layer index numbers of a fifth preset number of layers with a lowest layer delay to the first communication node.

7. The method of claim 1, wherein the layer information further comprises a layer priority; and
wherein the feeding back the layer information to the first communication node further comprises:
reporting layer index numbers of a sixth preset number of layers with a highest layer priority to the first communication node.

8. The method of claim 1, wherein the layer information further comprises at least one of: a layer used for a phase tracking reference signal, a layer used for a positioning reference signal, a beam with minimum strength or an antenna port with minimum strength.

9. The method of claim 1, wherein the layer information further comprises a target layer having a set attribute.

10. The method of claim 9, wherein the set attribute comprises at least one of: set received strength, a set delay, set interference or a set priority.

11. The method of claim 9, wherein a number of target layers having a set attribute is determined according to a rank, the number of the target layers having a set attribute is less than the rank, and the rank is a number of layers of the first communication node.

12. The method of claim 9, wherein the target layers in the layer information have an equivalent set attribute.

13. The method of claim 1, wherein the feeding back the layer information to the first communication node further comprises:
taking a layer with highest layer received strength as a layer that is the first to be reported to the first communication node.

14. The method of claim 1, wherein the layer information further comprises at least one of: an inclusion state for an indication of a layer with a highest layer received strength, an inclusion state for an indication of a layer with a smallest layer delay or an inclusion state for an indication of a target layer having a set attribute;
wherein the inclusion state comprises: inclusion or exclusion.

15. The method of claim 1, wherein the configuration information comprises at least one of a first configuration item or a second configuration item, wherein the first configuration item is configured to configure a target layer having a set attribute, and the second configuration item is configured to configure a layer reporting order.

16. A method for receiving layer information, comprising:
transmitting configuration information to a second communication node; and
receiving layer information fed back by the second communication node, wherein the layer information is determined by the second communication node according to the configuration information;
wherein the layer information comprises layer received strength, a layer delay and a layer index number;
in a case where the layer information of a second preset number of layers with a lowest layer delay fed back by the second communication node is received, determining a transmission characteristic of a layer according to the layer information, wherein the transmission characteristic comprises a transmission rank order;
wherein the transmission rank order comprises at least one of: a layer reporting order, an order of layers in a reporting sequence, a layer priority or a layer index number or
the transmission rank order comprises at least one of: a layer reporting order, an order of layers in a reporting sequence or a layer priority.

17. An apparatus for feeding back layer information, comprising:
one or more processors; and
one or more memories storing a computer program that when executed by the one or more processors cause the one or more processors to perform operations, the operations comprising:
receiving configuration information of a first communication node;
determining layer information of the first communication node according to the configuration information; and
feeding back the layer information to the first communication node;
determining a transmission rank order according to the layer information;
wherein the layer information comprises layer received strength, a layer delay and a layer index number; and
the transmission rank order comprises at least one of: a layer reporting order, an order of layers in a reporting sequence, a layer priority or a layer index number or
the transmission rank order comprises at least one of: a layer reporting order, an order of layers in a reporting sequence or a layer priority;
wherein the determining a transmission rank order according to the layer information comprises at least one of the following:
determining the transmission rank order according to a configuration order of the layer index number; or
determining the transmission rank order according to a reporting order of the layer index number;
wherein the feeding back the layer information to the first communication node comprises:
reporting layer information of a second preset number of layers with a lowest layer delay to the first communication node.

* * * * *